(12) United States Patent
Narayanan et al.

(10) Patent No.: US 11,818,233 B2
(45) Date of Patent: Nov. 14, 2023

(54) PORTABLE LED RECEIVER

(71) Applicant: DELL PRODUCTS L.P., Round Rock, TX (US)

(72) Inventors: Padmanabhan Narayanan, Redmond, WA (US); Vamshidhar Varre, Hyderabad (IN)

(73) Assignee: DELL PRODUCTS L.P., Round Rock, TX (US)

(*) Notice: Subject to any disclaimer, the term of this patent is extended or adjusted under 35 U.S.C. 154(b) by 262 days.

(21) Appl. No.: 17/148,271

(22) Filed: Jan. 13, 2021

(65) Prior Publication Data
US 2022/0224772 A1    Jul. 14, 2022

(51) Int. Cl.
| | | |
|---|---|---|
| G06F 3/14 | (2006.01) | |
| H04L 69/28 | (2022.01) | |
| H04L 7/00 | (2006.01) | |
| H04W 24/08 | (2009.01) | |
| G06F 3/04817 | (2022.01) | |
| H04L 67/75 | (2022.01) | |
| H04W 76/10 | (2018.01) | |
| H04W 4/80 | (2018.01) | |
| H04W 76/30 | (2018.01) | |

(52) U.S. Cl.
CPC .......... *H04L 67/75* (2022.05); *G06F 3/04817* (2013.01); *G06F 3/14* (2013.01); *H04L 7/0008* (2013.01); *H04L 69/28* (2013.01); *H04W 4/80* (2018.02); *H04W 24/08* (2013.01); *H04W 76/10* (2018.02); *H04W 76/30* (2018.02)

(58) Field of Classification Search
CPC ..... H04L 67/36; H04L 69/28; H04L 41/0668; H04L 41/0613; H04W 4/80; H04W 24/08; G06F 3/04817
See application file for complete search history.

(56) References Cited

U.S. PATENT DOCUMENTS

| | | | |
|---|---|---|---|
| 10,997,106 B1* | 5/2021 | Bandaru | G06F 13/385 |
| 2016/0381621 A1* | 12/2016 | Kim | H04W 4/80 |
| | | | 370/329 |
| 2021/0028987 A1* | 1/2021 | Krivenok | H04L 41/0869 |

* cited by examiner

*Primary Examiner* — Iqbal Zaidi
(74) *Attorney, Agent, or Firm* — NORTH WEBER & BAUGH LLP

(57) ABSTRACT

Described herein are embodiments for tracking status of switch ports in network switches using portable LED receivers (PLRs). LED data for a switch port may be transmitted from the network switch to a paired PLR. An electronic device, such as a smartphone, may be used to facilitate the pairing process. The electronic device connects to a network switch via an out of band management network like and pairs with a PLR using a management-plane BLE connection. A user may use an application operating in the electronic device to select a switch port of a network switch, logically associate the selected switch port to the PLR. Upon successful pairing, the PLR establishes a connection to the network switch and receive timestamped and sequenced LED data to drive LEDs on the PLR. The PLRs may enable disaggregation of LEDs from switch ports and provide more user flexibility and convenience.

20 Claims, 9 Drawing Sheets

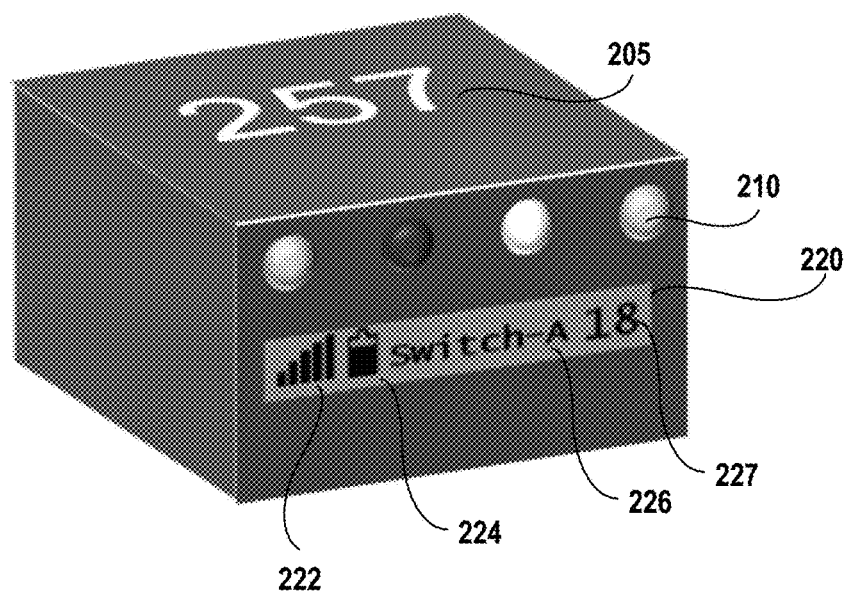
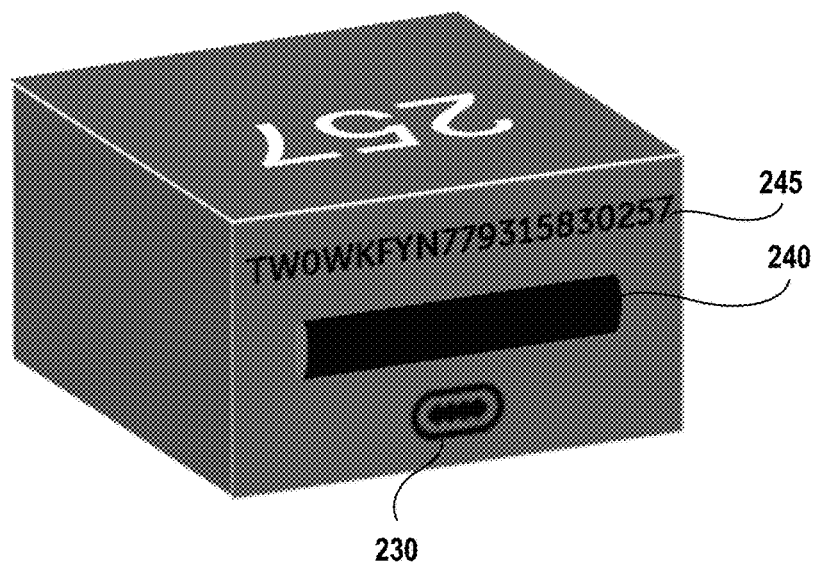
FIG. 2A

500

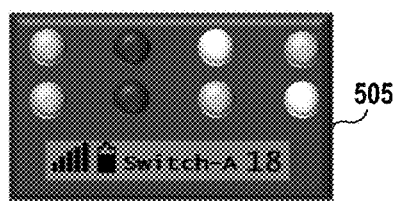

PLR for a port with 4 lanes and separate status and activity LEDs

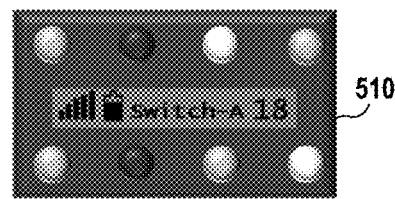

PLR for a port with 8 lanes and integrated status and activity LEDs

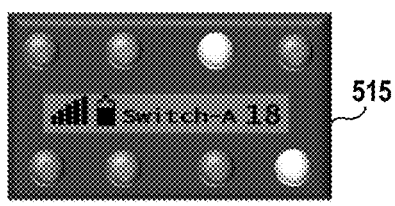

Color Vision Deficiency friendly LEDs for a port with 8 lanes and integrated status and activity LEDs

PLR for a port with 16 lanes and integrated status and activity LEDs

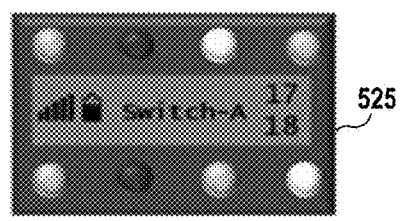

PLR for 2 ports with 4 lanes for each port, integrated status and activity LEDs, two LED rows layout

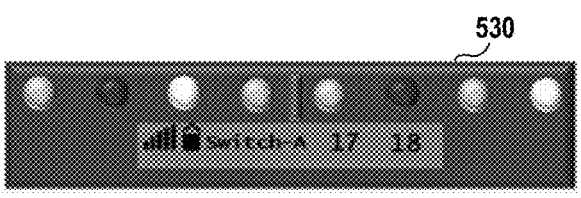

PLR for 2 ports with 4 lanes for each port, integrated status and activity LEDs, single LED row layout

PORTABLE LED RECEIVER

BACKGROUND

The present disclosure relates generally to network switch port status tracking. More particularly, the present disclosure relates to systems and methods for tracking port status of network switches using a portable light emitting diode (LED) receiver device.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Network switches are devices used in a network to manage communications between different networked devices. Network switches manage data flow across the network by transmitting one or more received network packets only to the one or more devices for which the packets are intended.

Networking switches may support ports of various spectrum (e.g., 1G to 400G) to provide wide possible range of connectivity options. "Super Spines" may even have 800G based deployments. A network switch may use one or more switch port light-emitting diodes (LEDs) as visual indicators for both the status (link up/down, speed) as well as activity. In some network switches, the status LED and the activity LED may be consolidated in a single LED. Some higher end switches may have per-lane LEDs that are activated after a port breakout.

A network switch operator or user may face various challenges in viewing the status of the LEDs. The LEDs may be obstructed by cabling (e.g., from adjacent port connections) and convenient viewing angles may not be available, especially when the network switch is higher up/lower down in a rack. Sometimes, it may be difficult to track the LED status for cable endpoints when they are not collocated in the same rack, a typical scenario when the user is already focusing on a screen on the crash cart. Additionally, when facing multiple LEDs on a front panel of a network switch, it may be difficult for a user to focus on the correct port due to LED light pollution.

Accordingly, it is highly desirable to find new, more efficient ways to track status of LEDs in network switches.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

FIG. 2A depicts various views of a Portable LED Receiver (henceforth PLR), according to embodiments of the present disclosure.

FIG. 5 depicts various PLR options, according to embodiments of the present disclosure.

DETAILED DESCRIPTION OF EMBODIMENTS

Figure 1:
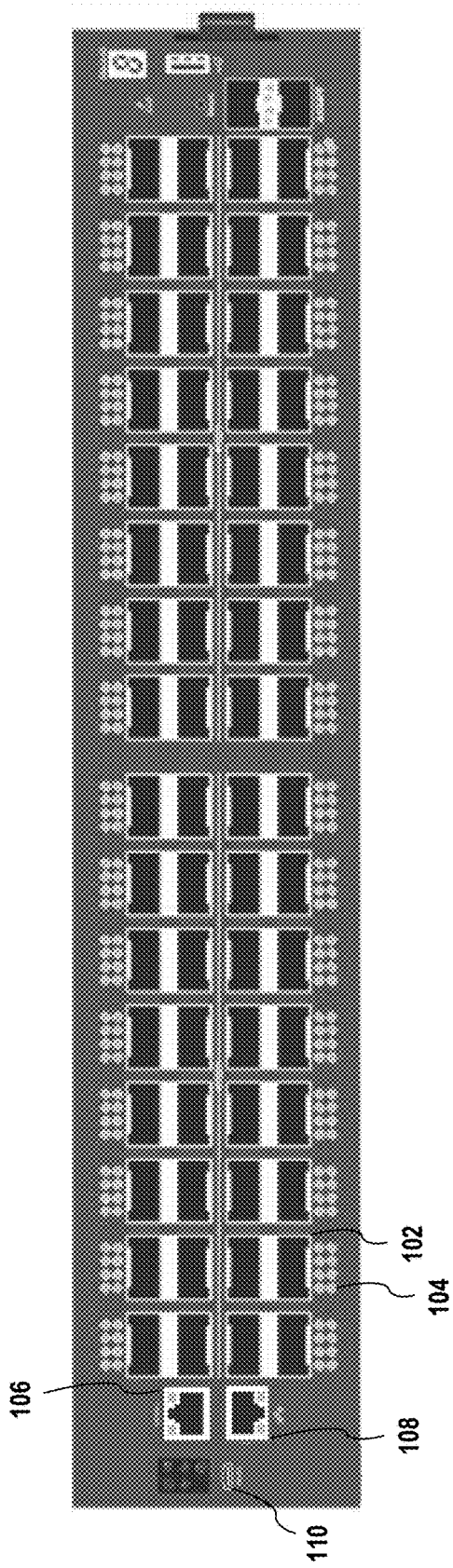
FIG. 1 ("FIG. 1") depicts a front panel of an exemplary network switch having multiple ports, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any examples are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell."

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

A. Introduction

Networking switches may support ports of various spectrum (e.g., 1G to 400G) to provide wide possible range of connectivity options. "Super Spines" may even have 800G based deployments. A network switch may use one or more switch port LEDs as visual indicators for both the status (link up/down, speed) as well as activity. In some network switches, the status LED and the activity LED may be consolidated in a single LED. Some higher end switches may have per-lane LEDs that are activated after a port breakout.

FIG. 1 depicts a front panel of an exemplary network switch having multiple ports 102. One or more port LEDs 104 may be used for each port as visual indicators for status and/or activity. In one or more embodiments, the port 102 may be a high bandwidth port supporting multiple lanes via a port breakout. Each of the multiple lanes may be an independent link from each other. For example, the port 102 may be a QSFP28 port with 100G bandwidth. The port may be configured as one 100G link, two 50G lanes, four 25G lanes, etc. In one or more embodiments, the number of port LEDs for each port may be the same as maximum lanes that the port is able to support. The port LEDs may use different colors and/or patterns to indicate status and/or activity for each lane.

For example, for a 100G port supporting maximum four port lanes, there are four LEDs for the port. An off LED may mean no link for a corresponding port lane. A 100 Gigabit Ethernet (GbE) uses only one LED, a 2×50 GbE uses two LEDs, and a 4×25 GbE uses all four LEDs. When the port is in 4×25G mode, four solid green LEDs may mean link operating at maximum speed for four lanes, four flashing green LEDs may mean link activity operating at maximum speed for four lanes, a solid yellow LED may mean one port lane is operating at a lower speed, etc.

In one or more embodiments, the network switch may also comprise a console port 106 and a management port 108. The console port 106 may be used to connect a computer directly to the switch and manage the switch. The management port 108 may be used for coupling to an out-of-band (OOB) management network for network management and configuration of the network switch. The OOB management operates on a "management-plane" that is separate from the "data plane" used by data traffic on the network switch. On the contrary, in-band management traffic uses the same "data-plane" as used by data traffic. Hence OOB management may continue to function even during event of data traffic congestion, device glitch or network attacks, thus providing improved switch security.

In one or more embodiments, the network switch may have a built-in interface or may use a USB port 110 to receive an external Bluetooth device (e.g., a USB dongle) to establish a Bluetooth connection to a pair device for data communication. In one or more embodiments, the built-in interface is a built-in interface is a Bluetooth Low Energy (BLE) interface, and the Bluetooth connection is a BLE connection.

Irrespective of front panel LED design if a network switch, the fundamental mechanism of generating the LED data has remained relatively unchanged over the years. A network processing unit (NPU) Media access control (MAC)/Application Specific Integrated Circuit (ASIC) has an internal LED microcontroller with a proprietary assembly language that is specific to the NPU vendor. The MAC's functional blocks refresh port data within an internal SRAM that the LED microcontroller code can access. The microcontroller code (that may be customized and specifically developed for each switch platform) wakes up periodically, e.g., every 33 milliseconds (refresh rate for the human eye), reads port status from the internal SRAM, filters/transforms/packages port LED bit stream and pushes it out to a serial output from the NPU that is typically connected to a complex programmable logic device (CPLD) buffer for latching/driving output to the physical LEDs on a front panel of the network switch.

A network switch operator or user may face various challenges in viewing the status of the LEDs. The LEDs may be obstructed by cabling (e.g., from adjacent port connections) and convenient viewing angles may not be available, especially when the network switch is higher up/lower down in a rack. Sometimes, it may be difficult to track the LED status for cable endpoints when they are not collocated in the same rack, a typical scenario when the user is already focusing on a screen on the crash cart. Additionally, when facing multiple LEDs on a front panel of a network switch, it may be difficult for a user to focus on the correct port due to LED light pollution.

For a network switch, its LED front panel is finalized during initial product design and cannot be changed. It might be possible to upgrade the CPLD firmware/microcontroller payload, but the front panel design remains static. 400G and upcoming 800G ports may even have higher breakout port densities and LED speed options on the front panel are limited. LEDs are competing for limited space on the front panel. Removing LEDs (as in 104) may provide better thermals and thereby support higher power optics.

Described herein are system and method embodiments for LED status tracking in network switches using portable LED receiver(s) such that the LEDs may be disaggregated from the network switch and LED design may be democratized to reduce the hardware and software complexity from the networking switch. Accordingly, the present invention may provide customers more flexibility (e.g., in terms of choosing their own LED design/behavior) and convenience (where the LEDs may be viewed from anywhere within a data center rather than from a cramped aisle facing the switch port). Since the status of the port LEDs are indication of the port activity status, embodiments of the present disclosure may also be used for switch port status tracking.

B. Embodiments of Portable LED Receivers

Various embodiments of portable LED receivers (PLRs) are presented in this section. The portable LED receivers may be configured to receive LED data from one or more paired network switches and thus provide an alternative and more flexible way to track status of port LEDs for the paired network switches. Furthermore, the LEDs of the portable LED receivers may be designed according to end-user preference for more flexibility. Such flexibility may not be a practical option or even not an option for network switches.

FIG. 2A depicts various views of a PLR device, according to embodiments of the present disclosure. In one or more embodiments, the PLR device is a handheld (e.g., typically 1 cubic inch) device that instantiates port LEDs found on a network switch. The front side of the PLR may comprise a plurality of visual indicators (e.g., LEDs) 210 and a display screen 220 (e.g., an LCD screen), which may be configured to display the network switch 226 that the PLR device is paired with, the port(s) 227 of the switch 226 to which the LEDs are mapped to, an LED stream signal strength indicator 222, and a battery indicator 224 to indicator battery level of the PLR. In one or more embodiments, the LED stream signal strength indicator 222 may have a "digital bar" layout that is user configurable to display various numbers of bars based on the LED packet drop rate. In one or more embodiments, the PLR comprise a rear side comprising a USB port (e.g., a micro USB port) 230 for charging/debugging and a groove 240 to insert clip that is capable of attaching the PLR to monitors/rack rails/crash cart. In one or more embodiments, a serial number 245 is printed on the rear end for PLR identification, with the last few digits (e.g., the last three digits) of the serial number 245 are also printed on at the top surface of the PLR as an easy identification mark 205.

Figure 2B:
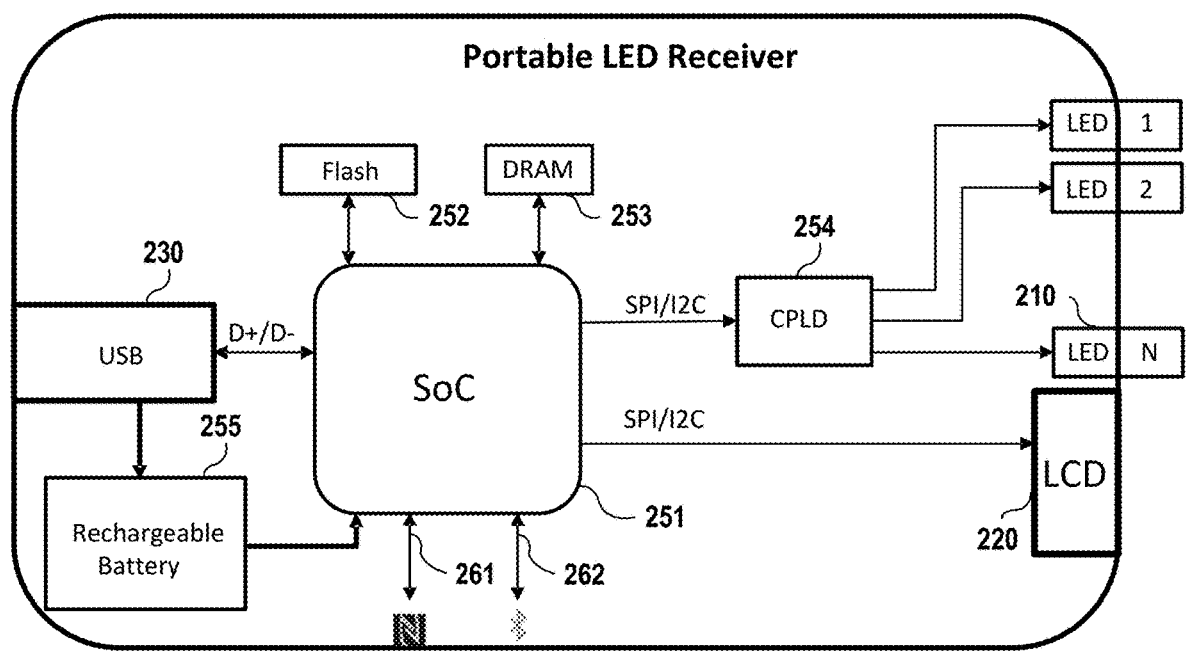
FIG. 2B depicts a block diagram of a portable LED receiver, according to embodiments of the present disclosure.

FIG. 2B depicts a block diagram of a portable LED receiver, according to embodiments of the present disclosure. As shown in FIG. 2, the PLR may comprise a system on a chip (SoC) circuit 251, a non-volatile memory (e.g., a Flash memory) 252, a volatile memory (e.g., a DRAM memory) 253, a CPLD 254 coupled between the SoC 251 and the plurality of LEDs 210, and a battery 255 which may be rechargeable. The CPLD 254 and the display 220 may communicate to the SoC 251 using serial peripheral interface (SPI) or inter-Integrated Circuit (I2C) bus.

In one or more embodiments, the SoC 251 may support near-field-communication (NFC) communication protocol and Bluetooth communication protocol such that the PLR may establish, upon activation, a NFC pairing 261 and/or a Bluetooth pairing 262 with external devices. In one or more embodiments, the Bluetooth pairing 262 is a BLE pairing.

C. Embodiments for PLR Pairing Process

For operation, the PLR needs to be paired to a network switch to receive LED data for one or more ports. Described in this section are embodiments for PLR Pairing to enable network switch LED status tracking on the PLR side.

Figure 3:
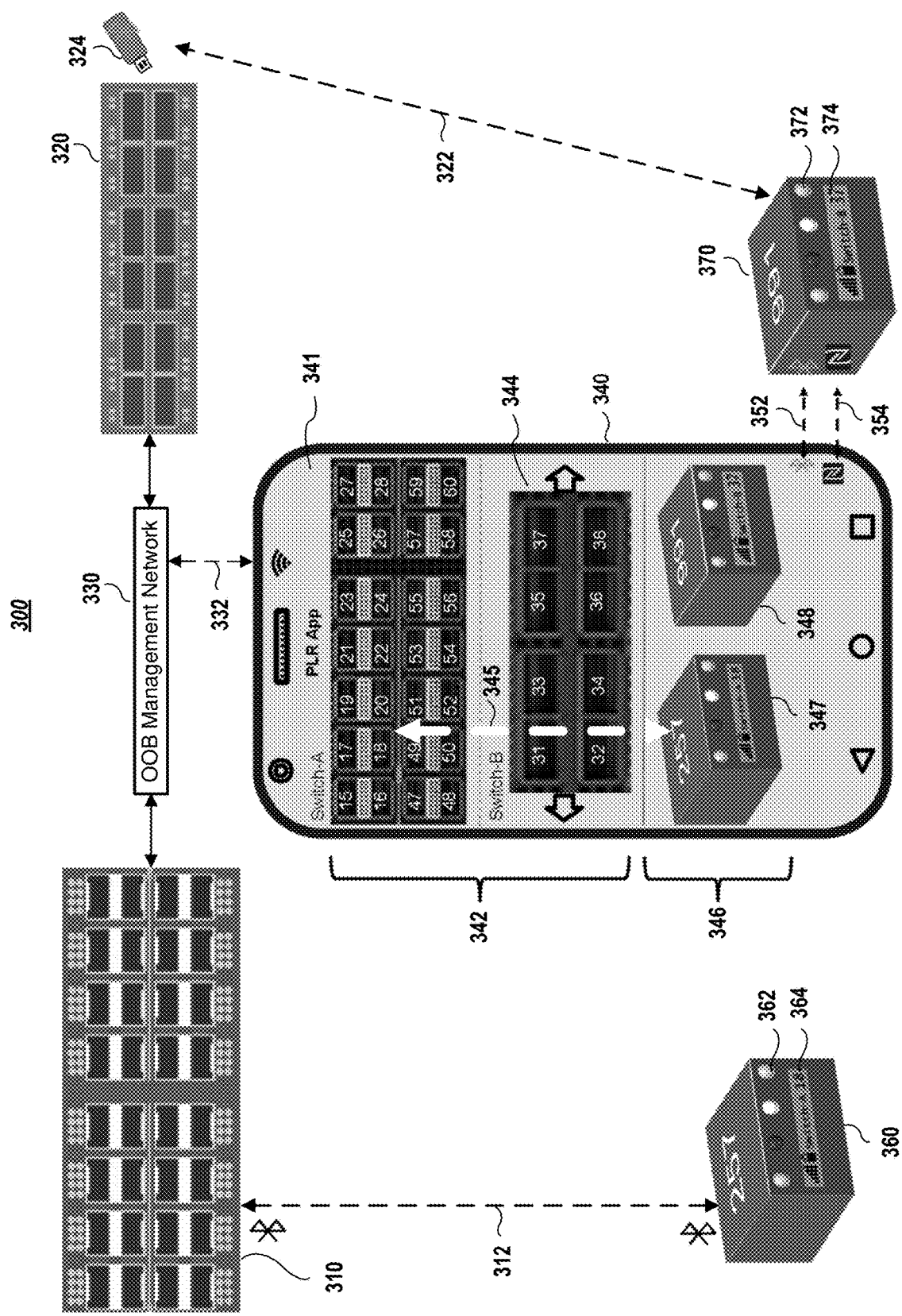
FIG. 3 graphically depicts a pairing process with a network switch using an app, according to embodiments of the present disclosure.
Figure 4:
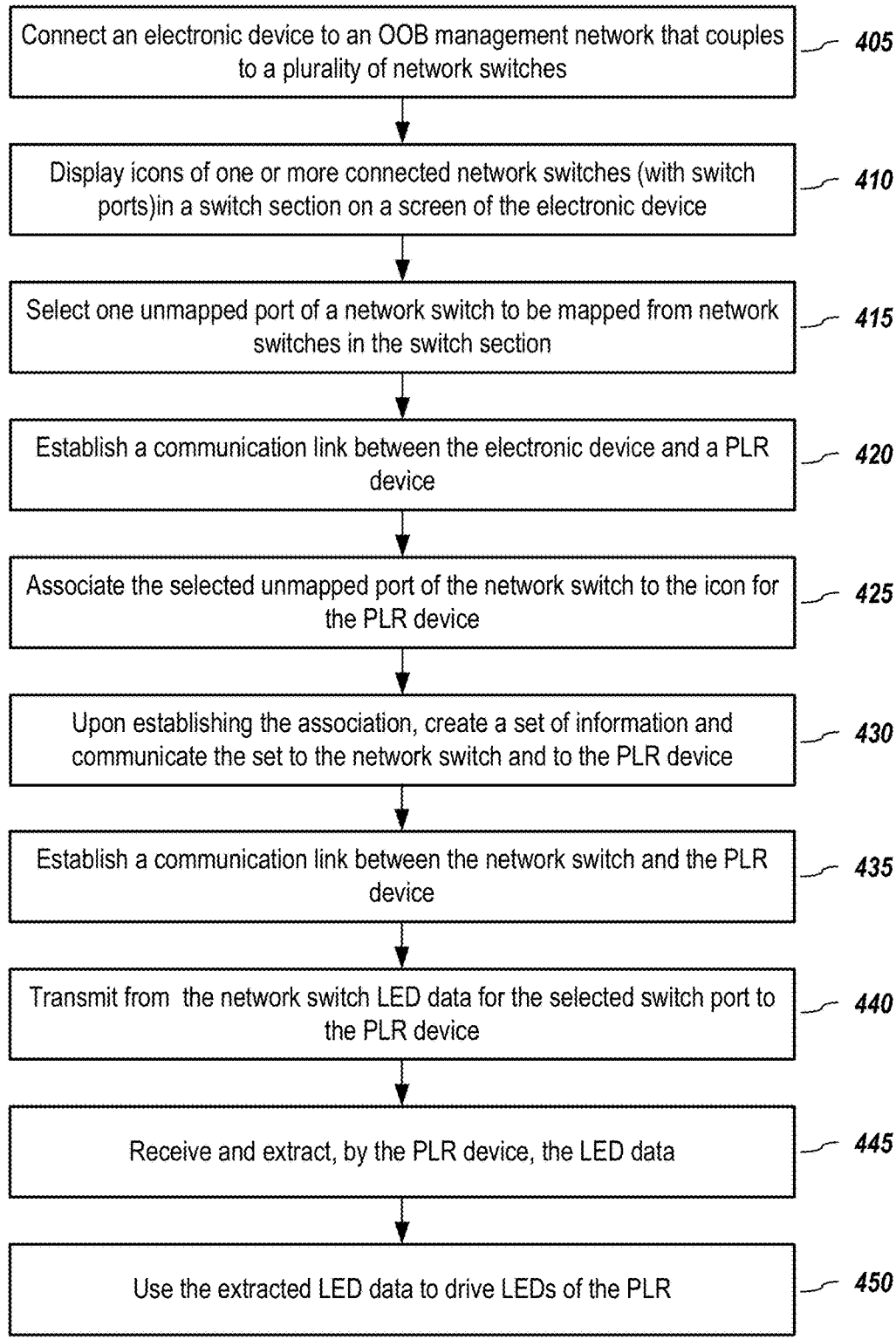
FIG. 4 depicts steps for a pairing process, according to embodiments of the present disclosure.

FIG. 3 graphically depicts a pairing process with a network switch and FIG. 4 depicts steps for the pairing process, according to embodiments of the present disclosure. The paring process may be facilitated via a third party, e.g., an application operated on another electronic device such as a smartphone, tablet, a laptop, etc.

As shown in FIG. 3, a system for implementing a pairing process involves an OOB management network 330, a PLR application (also referred as "PLR app") running on an electronic device 340. The OOB management network 330 couples to a plurality of network switches, including the first network switch 310 and the second network switch 320, for network control and configuration management.

In one or more embodiments, an LED server software module running on a host CPU of a network switch (e.g., the first network switch 310 and the second network switch 320) is capable of extracting port information from an NPU in the network switch and streaming it over a BLE interface along with timestamps to a paired BLE device (e.g., a PLR device). The networking switch may set up a Network Time Protocol (NTP) relay to propagate timing to any paired BLE devices. NTP is a networking protocol for clock synchronization between devices in a network. NTP Implementation may include sending and receiving timestamps using the User Datagram Protocol (UDP).

In step 405, the electronic device, e.g., a smartphone" connects to the OOB management network 330 to which a network switch 310 may be connected. In one or more embodiments, the connection to the OOB management is a secure connection, e.g., via a secure Wi-Fi network connection, such that any non-authorized access attempts are blocked or rejected.

In step 410, when the PLR application is running, icons of one or more connected network switches (with switch ports) are displayed in a switch section 342 on a screen 341 of the electronic device 340. In one or more embodiments, if a network switch (e.g., switch A) has already mapped one or more ports to one PLR device, an icon of the network switch is shown on top of the switch section 342 with the mapped ports (e.g., port 18) highlighted. In one or more embodiments, the mapped port is visually linked to an icon 347 of a paired PLR device 360 via an indicator 345. The paired PLR device 360 may pair to the network switch 310 via a Bluetooth connection, e.g., a BLE connection 312, to receive LED data for a mapped port (e.g., port 18) from the network switch 310 directly. The display screen 364 of the PLR device 360 shows the switch network hostname (e.g., switch-A) and a port number (e.g., 18). LEDs 362 indicate the same status and pattern as port LEDs for port 18 on the network switch 310. Such a direct link between the PLR and the network switch does not take any bandwidth from the OOB management network, therefore does not cause congestion for the OOB management network from LED data transmission. Furthermore, the physical LEDs on the PLR may be larger in size and much less crowded compared to port LEDs on the network switch, therefore causing much less visual fatigue for a user.

In step 415, a user may select one unmapped port of one network switch to be mapped from network switches in the switch section. The unmapped port may be a port (e.g., port 37) from a network switch (e.g., switch B) that has not yet paired to any PLRs, or a port from network switch (e.g., switch A) that has one or more ports mapped but still need further port mapping for status tracking. In one or more embodiments, a user may scroll, e.g., horizontally or vertically, icons of connected network switches (or ports within a network switch icon) for a desirable selection.

In step 420, a communication link between the electronic device 340 and a PLR device 370 (which is to be paired) is established. The communication link may be a NFC connection 354, or a BLE connection 352. In one or more embodiments, the user may bring the PLR devices within the NFC range of the electronic device for establishing the NFC connection. In one or more embodiments, the electronic device 340 and a PLR device 370 may drop an established NFC connection and switch to the BLE connection, once a BLE connection is available, to facilitate faster configuration between the PLR app and the PLR device 370. Such a BLE connection 352 is a management-plane BLE connection that is used to exchange configuration information between the app and the PLR. Once the communication link between the electronic device 340 and the PLR device 370 is established, an icon 348 for the PLR device 370 appears on a "PLR device" section 346 on the screen 341 of the electronic device 340. In one or more embodiments, the PLR device section 346 is arranged below the switch section 342.

In step 425, the selected unmapped port (e.g., port 37) of one network switch is associated to the icon 348 for the PLR device 370 by the user. In one or more embodiments, such an association may be implemented by multi-touch of the port and the icon 348 on the screen 341, by dragging the icon 348 into the port (e.g., port 37), by dragging the selected port to the icon 348, or by manually inputting an association command, etc.

In step 430, upon establishing the association, a set of information (e.g., a 3-tuple) comprising at least the {PLR device ID, Switch Host Name, Switch Port #} is created by the PLR App and communicated to the relevant network switch (e.g., switch-B 320) over the OOB Management network 330 and to the PLR device 370 via the communication link. As shown in FIG. 3, {PLR (257), Switch-A, Port 18} and {PLR (991), Switch-B, Port 37} are two examples of 3-tuples. In one or more embodiments, the switch's hostname is uniquely associated with a serial number (S/N) or a service tag of the network switch; and the PLR's device ID is associated with its S/N. The LED Server on the Switch awaits connection from the PLR device.

In step 435, a communication link 322 between the network switch 320 and the PLR device 370 is established. In one or more embodiments, the communication link 322 bypasses the electronic device. In one or more embodiments, the communication link 322 is a direct communication link, e.g., a data-plane BLE connection via an integrated BLE transmitter within the network switch 320 or an external BLE-supporting device (e.g., the USB dongle 324) coupled to the network switch 320. In one or more embodiments, before the establishment of the direct communication link 322, the PLR device 370 unpairs the management-plane BLE connection 352 to initiate the data-plane BLE connection 322. In one or more embodiments, the PLR device 370 is capable of maintaining multiple BLE connections and therefore, both the data-plane BLE connection 322 and the management-plane BLE connection 352 may be alive. In one or more embodiments, once the BLE pairing between the PLR device 370 and the network switch 320 is complete, a NTP client on the PLR device updates the local clock based on updates from the NTP relay configured on the network switch's BLE interface, wherein the network switch is running as a NTP sever.

In step 440, the PLR device 370 requests the paired network switch 320 to transmit LED data for the specific switch port (e.g., port 37) over the data-plane BLE connection 322. The paired network switch 320 starts transmitting LED data for the specific switch port. In one or more embodiments, the LED data is transmitted in a timestamped and sequenced stream comprising a protocol buffer (protobuf) (or other applicable encodings) encoded in UDP periodically (e.g., every 33 milliseconds or less depending on the capability of the network switch and the PLR). In one or more embodiments, the protobuf may comprise a timestamp generated during LED data sampling at the NPU's SRAM, a monotonically increasing sequence number, and per-lane LED data for the port.

In step 445, the PLR device 370 receives and extracts the LED data. In one or more embodiments, the PLR device 370 reassembles the protobuf based on sequence number and discards data that is older than a pre-configured value, e.g., 33 milliseconds.

In step 450, the PLR device 370 uses the extracted LED data (e.g., per-lane LED data) to drive the LEDs 372 of the PLR device 370. The display screen 374 displays the paired switch's hostname and the switch port. In one or more embodiments, a stream signal strength indicator, e.g., a "digital bar" indicator, displays LED stream reception quality as a function of a configured packet loss in the previous T refresh intervals using the timestamp and the sequence numbers, where T is an integer number larger than 1. For example, an indictor with 5 bars means 0 packet loss; an indictor with 5 bars means 1 packet loss in the past 10 seconds; and so on.

It shall be noted that the steps shown in FIG. 4 are for exemplary embodiments. A pairing process may be implemented with different variations, e.g., with certain steps performed optionally, or performed in different orders, etc. In one or more embodiments, when a network that has paired to a PLR for a first port and the PLR has capacity to receive LED data for additional ports besides the first port, if a user would like to track a second port of the network switch using the same PLR, the user may associate the second port with the PLR. Since the PLR has paired with the network switch already (e.g., using a BLE connection), the PLR and the network switch do not need to go through the pairing process again. The PLR app may just need to update the tuple to include additional information of the newly associated port and communicate the updated tuple to the network switch and the PLR. Upon receiving the updated tuple, the network switch may transmit updated LED data for both the first port and the second port. The PLR receives the updated LED data for extraction and LED driving.

In one or more embodiments, when a user would like to stop mapping between a port and a PLR (e.g., after port LED status tracking done), the user may disassociate the port from the PLR using the PLR app. In one or more embodiments, such a disassociation may be implemented by touching the port or the icon of the PLR followed by a disassociation selection, or by manually inputting a disassociation command, etc.

D. Embodiments for PLR Port Configurations

In one or more embodiments, the PLR device may have various layouts with some layouts capable of supporting LED status tracking for multiple switch ports of a network switch simultaneously. FIG. 5 depicts PLR options for various switch port speeds, breakout, or LED behavior, according to embodiments of the present disclosure. PLR option 505 is for a port with up to 4 lanes, with each lane having separate status and activity LEDs. PLR option 510 is for a port with up to 8 lanes with each lane having an integrated status and activity LED. PLR option 515 is similar to option 510 but PLR 515 has color vision deficiency friendly LEDs (e.g., purple and amber LEDs instead of red and green LEDs), thus. Such an option makes it suitable for users having "color blindness" for red and green. PLR option 520 is for a port with 16 lanes with each lane having an integrated status and activity LED. PLR option 525 is for two ports with 4 lanes for each port and each lane having an integrated status and activity LED. PLR option E has a two-row LED layout. PLR option 530 is similar to option E for two port, but with a single LED row layout.

Because of the different switch port speed/breakout and various PLR layouts, it may be possible that when a user attempts to map a PLR device to a switch port, there is a mismatch, e.g., the port has a port breakout for 8 lanes, while the PLR only supports up to 4 lanes. Accordingly, it might be desirable to have some matching verification such that port LED status of the port may be fully and accurately tracked.

Figure 6:
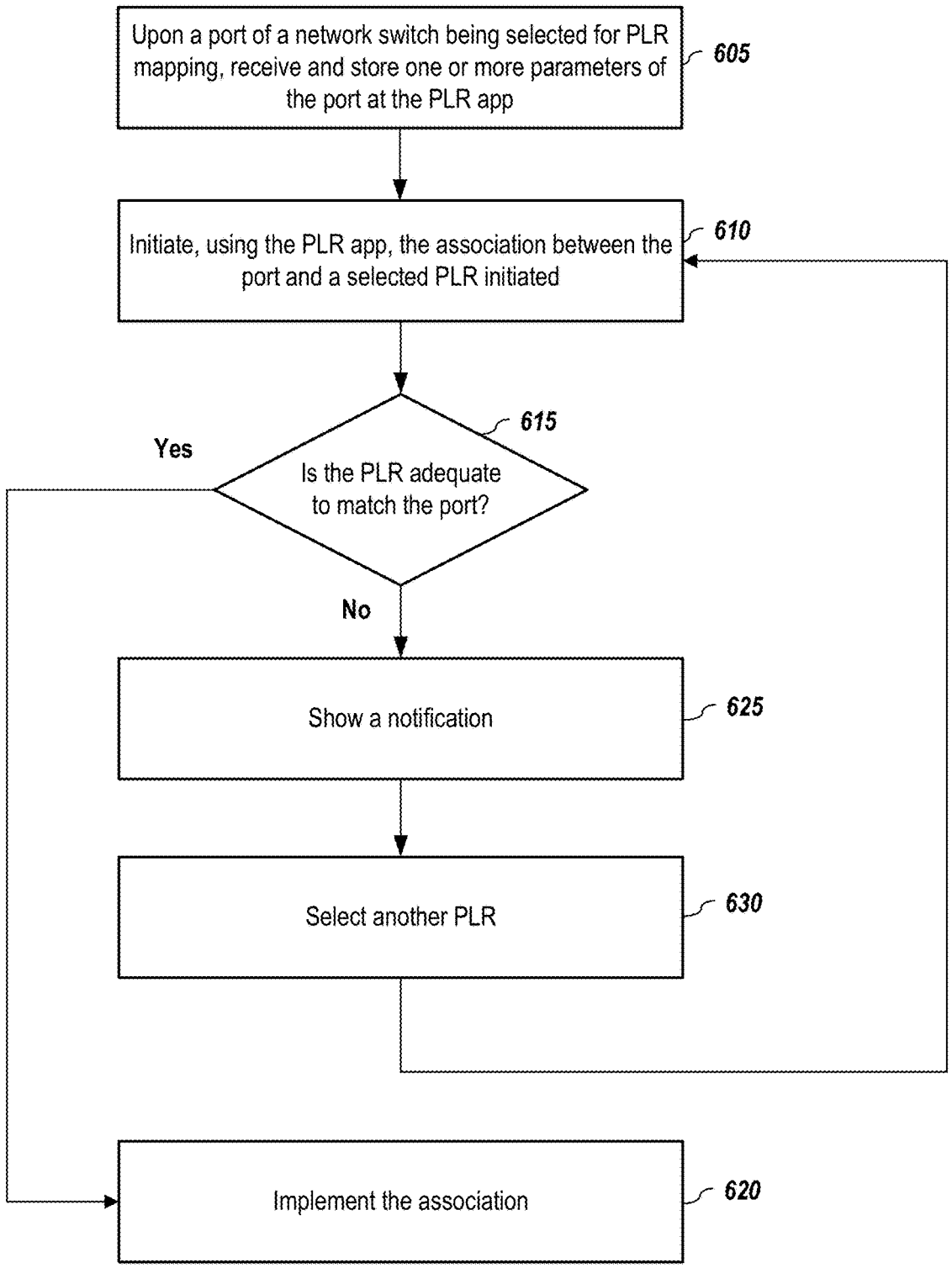
FIG. 6 depicts verification steps for a pairing process, according to embodiments of the present disclosure.

FIG. 6 depicts a matching verification process for a pairing process, according to embodiments of the present disclosure. One or more steps shown in FIG. 6 may be integrated into FIG. 4. One or more steps in the matching process shown in FIG. 6 may be integrated into the PLR application to provide additional functionality for the application.

Upon a port of a network switch being selected for PLR mapping, the PLR app receives, from the OOB management network, and stores (605) one or more parameters, e.g., speed, number of breakout lanes, port LED configuration (separate or integrated LED for port/lane status and activity), etc., of the port.

Upon initiating (610) of association (on a PLR app) between the port and a selected PLR initiated, the PLR app verifies (615) whether the PLR is adequate to match the port, e.g., whether the PLR has enough LEDs available for the port, whether the PLR has an LED layout matching the port LED, etc.

If the PLR is adequate to match the port, the association is implemented (620) for completion. While if the PLR is not adequate to match the port, the PLR app shows (625) a notification for user's attention that the association may not be implemented. The notification may be a pop-out message, a flashing red error sign, etc. Afterwards, the user may select (630) another PLR. Afterwards, the process goes back to step 610 for another round of association initiation and verification.

In one or more embodiments, a user desires to use an existing PLR (or has limited PLR choices) to track as many switch ports as possible. Accordingly, instead of selecting another PLR, the user may choose another switch port. Afterwards, the process goes back to step 605 for association initiation and verification.

In one or more embodiments, a PLR may have more LEDs than port LEDs for a matched switch port on a network switch. Those additional LEDs may be used or configured to show additional information for the switch port using the LED data transmitted from the network switch. This additional information may not be visible from the network switch side due to limited space (thus limited number of port LEDs for each port) on the front panel of the network switch. For example, the additional LEDs may have different colors from the port LEDs on the network switch for additional status information, e.g., a breakout lane activity above/below 50% of a designed full lane speed. Accordingly, the PLR may be used to provide enhanced functionality for port status tracking.

E. System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more disk drives, one or more network ports for communicating with external devices as well as various input and output (I/O) devices, such as a keyboard, mouse, stylus, touchscreen, and/or video display. The computing system may also include one or more buses operable to transmit communications between the various hardware components.

Figure 7:
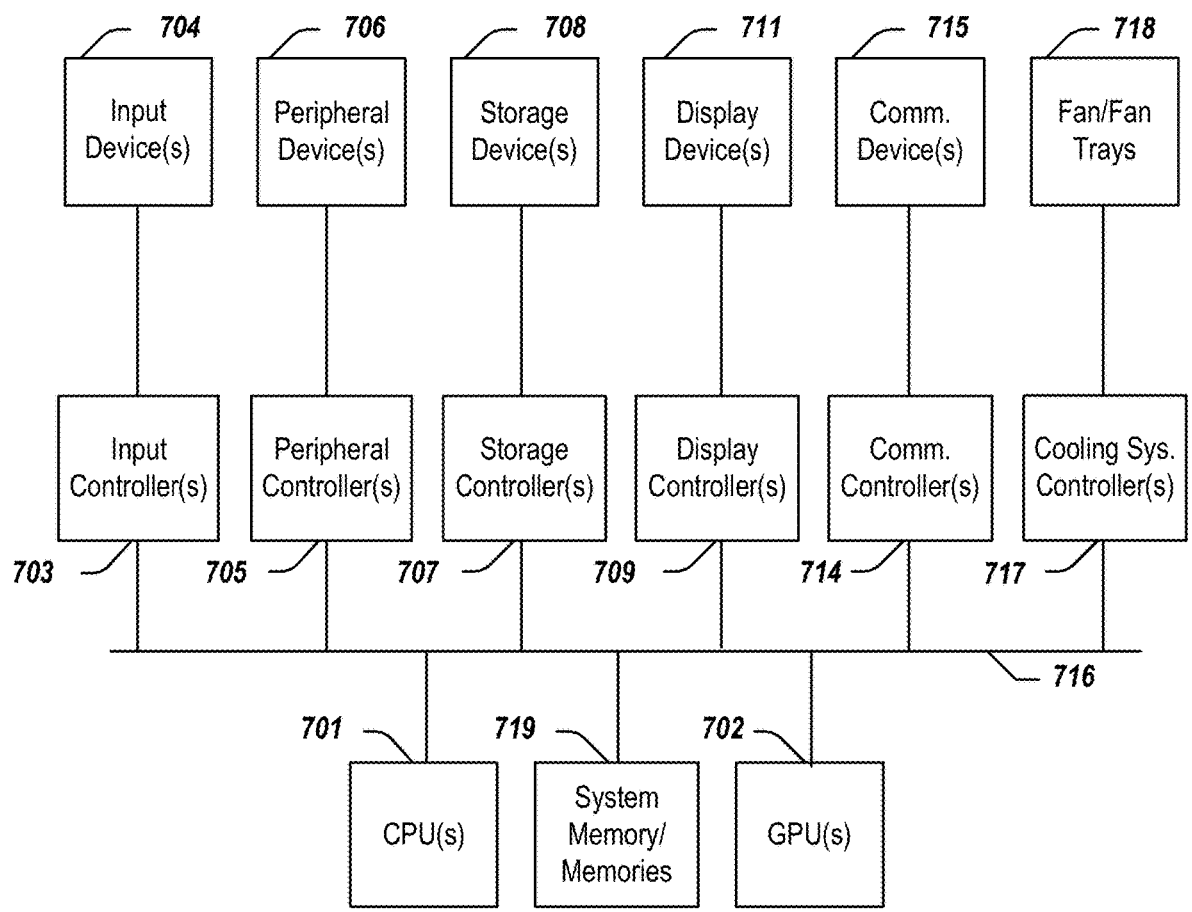
FIG. 7 depicts a simplified block diagram of an information handling system, according to embodiments of the present disclosure.

FIG. 7 depicts a simplified block diagram of an information handling system (or computing system), according to embodiments of the present disclosure. It will be understood that the functionalities shown for system 700 may operate to support various embodiments of a computing system—although it shall be understood that a computing system may be differently configured and include different components, including having fewer or more components as depicted in FIG. 7.

As illustrated in FIG. 7, the computing system 700 includes one or more central processing units (CPU) 701 that provides computing resources and controls the computer. CPU 701 may be implemented with a microprocessor or the like and may also include one or more graphics processing units (GPU) 702 and/or a floating-point coprocessor for mathematical computations. In one or more embodiments, one or more GPUs 702 may be incorporated within the display controller 709, such as part of a graphics card or cards. The system 700 may also include a system memory 719, which may comprise RAM, ROM, or both.

A number of controllers and peripheral devices may also be provided, as shown in FIG. 7. An input controller 703 represents an interface to various input device(s) 704, such as a keyboard, mouse, touchscreen, and/or stylus. The computing system 700 may also include a storage controller 707 for interfacing with one or more storage devices 708 each of which includes a storage medium such as magnetic tape or disk, or an optical medium that might be used to record programs of instructions for operating systems, utilities, and applications, which may include embodiments of programs that implement various aspects of the present disclosure. Storage device(s) 708 may also be used to store processed data or data to be processed in accordance with the disclosure. The system 700 may also include a display controller 709 for providing an interface to a display device 711, which may be a cathode ray tube (CRT) display, a thin film transistor (TFT) display, organic light-emitting diode, electroluminescent panel, plasma panel, or any other type of display. The computing system 700 may also include one or more peripheral controllers or interfaces 705 for one or more peripherals 706. Examples of peripherals may include one or more printers, scanners, input devices, output devices, sensors, and the like. A communications controller 714 may interface with one or more communication devices 715, which enables the system 700 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 700 comprises one or more fans or fan trays 718 and a cooling subsystem controller or controllers 717 that monitors thermal temperature(s) of the system 700 (or components thereof) and operates the fans/fan trays 718 to help regulate the temperature.

In the illustrated system, all major system components may connect to a bus 716, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 8:
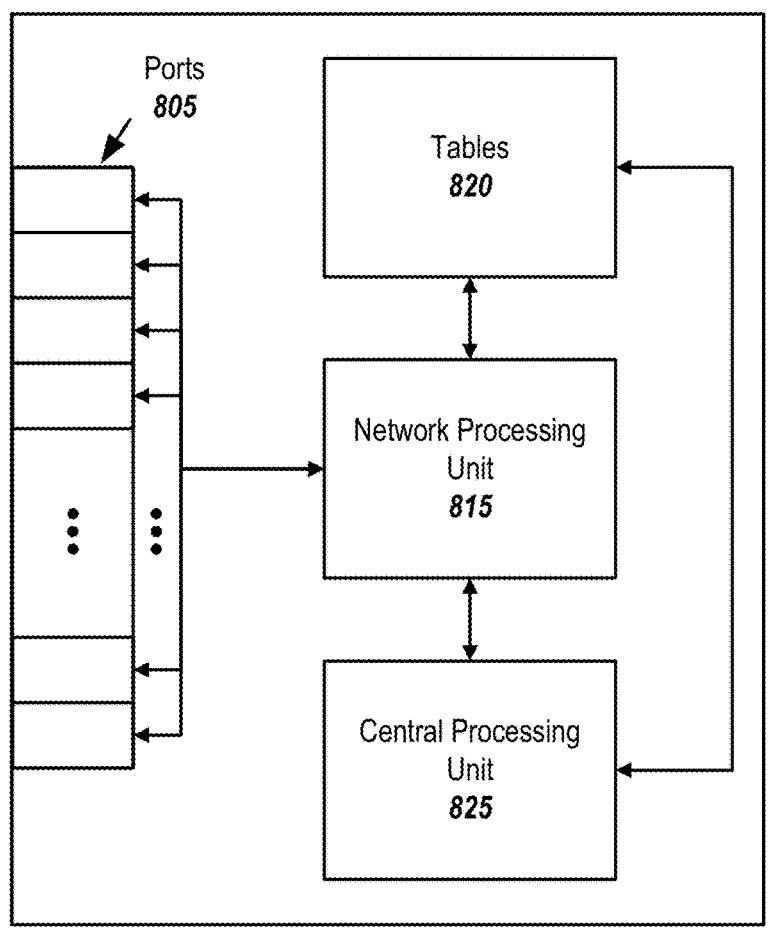
FIG. 8 depicts an alternative block diagram of an information handling system, according to embodiments of the present disclosure.

FIG. 8 depicts an alternative block diagram of an information handling system, according to embodiments of the present disclosure. It will be understood that the functionalities shown for system 800 may operate to support various embodiments of the present disclosure—although it shall be understood that such system may be differently configured and include different components, additional components, or fewer components.

The information handling system 800 may include a plurality of I/O ports 805, a network processing unit (NPU) 815, one or more tables 820, and a central processing unit (CPU) 825. The system includes a power supply (not shown) and may also include other components, which are not shown for sake of simplicity.

In one or more embodiments, the I/O ports 805 may be connected via one or more cables to one or more other network devices or clients. The network processing unit 815 may use information included in the network data received at the node 800, as well as information stored in the tables 820, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method for tracking port status comprising:
   communicatively connecting an electronic device to a management network that couples to one or more information handling systems;
   displaying, on a screen of the electronic device, at least one icon corresponding to one of the one or more information handling systems;
   establishing a connection between the electronic device and a portable device such that an icon of the portable device appears on the screen of the electronic device; and
   aiding in forming a communication link between one of the information handling systems and the portable device by performing steps comprising:
      associating, using the electronic device, a selected port of the information handling system with the portable device;
      creating, using the electronic device, a set of information related to the association; and
      communicating the set of information to the information handling system and the portable device to help establish the communication link between the information handling system and the portable device, wherein the communication link bypasses the electronic device.

2. The method of claim 1 wherein the communication link between the information handling systems and the portable device is used to transmit data from the information handling system to the portable device, which uses at least some of the data to drive one or more visual indicators of the portable device.

3. The method of claim 1 wherein the information handling system is a network switch and the management network is an out-of-band (OOB) management network.

4. The method of claim 1 wherein the connection between the electronic device and a portable device is a management-plane Bluetooth Low Energy (BLE) connection to exchange configuration information of the portable device.

5. The method of claim 4 wherein the management-plane Bluetooth Low Energy (BLE) connection is established after a Near Field Communication (NFC) pairing is setup between the electronic device and a portable device, the NFC pairing is dropped after the management-plane BLE connection is established.

6. The method of claim 1 wherein the communication link is a data-plane Bluetooth Low Energy (BLE) connection.

7. The method of claim 1 wherein the set of information is a tuple comprising at least identification of the portable device, an identifier of the information handling system, and port number of the selected port.

8. The method of claim 1 wherein the portable device displays a hostname of the information handling system and port number of the selected port on a display screen of the portable device.

9. The method of claim 1 wherein the information handling system is a network switch, and the communication link between the network switch and the portable device is further used for the portable device to synchronize the portable device's local clock with the network switch.

10. The method of claim 9 wherein data is transmitted from the network switch in a timestamped and sequenced stream.

11. The method of claim 10 wherein the timestamped and sequenced stream comprises a protobuf encoded in User Datagram Protocol (UDP) periodically, the protobuf comprises a timestamp generated during data sampling at a memory for a network processing unit (NPU) within the network switch, a monotonically increasing sequence number, a timestamp derived from NTP and data associated with each of multiple breakout lanes for the selected port.

12. A non-transitory computer-readable medium or media comprising one or more sequences of instructions which, when executed by at least one processor, causes steps to facilitate port status tracking to be performed comprising:
   communicatively connecting an electronic device to an out-of-band (OOB) management network that couples to one or more information handling systems;
   displaying, on a screen of the electronic device, at least one icon corresponding to one of the one or more information handling systems;
   establishing a connection between the electronic device and a portable device such that an icon of the portable device appears on the screen of the electronic device;
   forming an association, using the electronic device, that relates a selected port of the information handling system with the portable device in which the association comprises a set of information comprising at least identification of the portable device, an identifier of the information handling system, and a port number of the selected port; and
   communicating the set of information to the information handling system and to the portable device such that the information handling system and the portable device are able to establish a communication link that bypasses the electronic device.

13. The non-transitory computer-readable medium or media of claim 12 wherein the connection between the electronic device and a portable device is a management-plane Bluetooth Low Energy (BLE) connection to exchange information.

14. The non-transitory computer-readable medium or media of claim 12 wherein the selected port is selected by a user and the non-transitory computer-readable medium or media further comprises one or more sequences of instructions which, when executed by at least one processor, causes steps to be performed comprising:
   being configured to receive, via the electronic device, a selection, from a user, of a port of the information handling system to be the selected port.

15. The non-transitory computer-readable medium or media of claim 12 wherein the step of associating, using the electronic device, a selected port of the information handling system with the portable device further comprises:
  receiving, from the OOB management network, one or more parameters for the selected port;
  verifying, using the electronic device, whether the portable device is adequate to match the selected port; and
  completing the association upon verifying that the portable device is adequate to match the selected port.

16. A portable device comprising:
  one or more visual indicators;
  one or more communication interfaces;
  one or more memories; and
  a processor communicatively coupled to the one or more communication interfaces and to the one or more memories, wherein the portable device is configured to:
    establish a communication link with an information handling system among one or more information handling systems;
    receive data transmitted from the information handling system regarding a port of the information handling system and extract data for driving at least one of the one or more visual indicators; and
    interfacing with an electronic device comprising an application that is configured for:
      communicatively coupling the electronic device to a management network;
      displaying at least one icon, which represents one of the information handling systems of the one or more information handling systems, on a screen of the electronic device;
      establishing a connection between the electronic device and the portable device such that an icon of the portable device is displayable on the screen of the electronic device;
      forming an association that relates the port of the information handling system to the icon for the portable device, wherein the association comprises a set of information comprises at least identification of the portable device, an identification of the information handling system, and a port number of the port; and
      communicating the set of information to the information handling system and the portable device such that the information handling system and the portable device are able to establish the communication link that bypasses the electronic device.

17. The portable device of claim 16 wherein the communication link is a data-plane Bluetooth Low Energy (BLE) connection.

18. The portable device of claim 16 wherein the information handling system is a network switch, the data are transmitted from the network switch in a timestamped and sequenced stream, the timestamped and sequenced stream comprises a protobuf encoded in User Datagram Protocol (UDP) periodically, the protobuf comprises a timestamp generated during data sampling at a memory for a network processing unit (NPU) within the network switch, a monotonically increasing sequence number, and data associated with each of multiple breakout lanes for the port.

19. The portable device of claim 18 wherein the portable device reassembles the protobuf based on sequence number and discards data that is older than a pre-configured value.

20. The portable device of claim 16 wherein at least one of the one or more visual indicators is a display screen and the portable device displays a stream signal strength indicator on the display screen, the stream signal strength indicator comprises one or more indicators corresponding to a quality of the stream received.

* * * * *